United States Patent
Penumethsa

(10) Patent No.: US 10,938,719 B2
(45) Date of Patent: Mar. 2, 2021

(54) METHODS OF TRANSFORMING DATA PACKETS AND SYSTEMS USING EXECUTABLE DATA PACKETS

(71) Applicant: NCR Corporation, Duluth, GA (US)

(72) Inventor: Aditya Penumethsa, Hyderabad (IN)

(73) Assignee: NCR Corporation, Atlanta, GA (US)

(*) Notice: Subject to any disclaimer, the term of this patent is extended or adjusted under 35 U.S.C. 154(b) by 230 days.

(21) Appl. No.: 14/948,698

(22) Filed: Nov. 23, 2015

(65) Prior Publication Data

US 2017/0149662 A1    May 25, 2017

(51) Int. Cl.
| | |
|---|---|
| *H04L 12/741* | (2013.01) |
| *H04L 12/26* | (2006.01) |
| *H04L 29/06* | (2006.01) |
| *H04L 12/733* | (2013.01) |

(52) U.S. Cl.
CPC ............ *H04L 45/74* (2013.01); *H04L 45/745* (2013.01); *H04L 63/0428* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 7,398,322 B1* | 7/2008 | Perlman | ................. | H04L 12/462 709/238 |
| 8,131,877 B2* | 3/2012 | Hutchison | ............... | H04L 69/22 709/212 |
| 8,843,643 B2* | 9/2014 | Larson | .............. | H04L 29/12066 709/227 |
| 2004/0156368 A1* | 8/2004 | Barri | ....................... | H04L 49/25 370/395.63 |
| 2005/0169270 A1* | 8/2005 | Mutou | ................. | H04L 12/4641 370/390 |
| 2012/0134287 A1* | 5/2012 | Turunen | .................. | H04W 4/06 370/252 |
| 2014/0119189 A1* | 5/2014 | Lin | ..................... | H04L 12/4633 370/235 |
| 2016/0359738 A1* | 12/2016 | Sullenberger | ........... | H04L 45/74 |

OTHER PUBLICATIONS

"U.S. Appl. No. 14/948,698, Response filed Dec. 8, 2017 to Non Final Office Action dated Sep. 8, 2017", 7 pgs.

* cited by examiner

*Primary Examiner* — Kevin C. Harper
*Assistant Examiner* — Derrick V Rose
(74) *Attorney, Agent, or Firm* — Schwegman. Lundberg & Woessner

(57) ABSTRACT

Methods of transforming a data packet are described. More particularly methods of transforming a data packet, that include receiving at a router a communication data packet from a server, extracting embedded executable instructions from the communication data packet, and transforming the communication data packet at the router by executing, with a processor of the router, the embedded executable instructions are described. Additionally, router in communication with a Self-Service Terminal (SST) or network of SSTs that utilize data packets have executable instructions are described.

13 Claims, 5 Drawing Sheets

METHODS OF TRANSFORMING DATA PACKETS AND SYSTEMS USING EXECUTABLE DATA PACKETS

BACKGROUND

Data packets are basic units of communication and information that can be transmitted over a network, e.g., from a server to various network nodes, such as routers and terminals, and can carry information relevant to the network. Data packets can take various formats depending on the protocol around which the data packet is designed. In some cases, data packets can be communicated to or from Self-Service Terminals (SSTs), such as Automated Teller Machines (ATMs) via a network.

SUMMARY

In various embodiments, methods and systems for transforming data packets are presented.

According to an embodiment, the method can include the steps of receiving at a router a communication data packet from a server, extracting embedded executable instructions from the communication data packet, and transforming the communication data packet at the router by executing, with a processor of the router, the embedded executable instructions. Exemplary embedded executable instructions can include, e.g., hop counts and cloning instructions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As noted above, data packets are basic units of communication and information that can be transmitted over a network, e.g., from a server to various network nodes, such as routers and terminals. One challenge with currently used and existing data packets is that data packets may be capable of carrying information across a network, but lack the ability to give instructions specifically related to a given data packet to the routers and other nodes of a network at which they are received. The presently described methods and systems provide a solution for this issue.

In various embodiments, the present solution relates to a method of transforming a data packet. The method can include the steps of receiving at a router a communication data packet from a server, extracting embedded executable instructions from the communication data packet, and transforming the communication data packet at the router by executing, with a processor of the router, the embedded executable instructions.

In another embodiment, the present solution relates to a router connected to a wide area network configured to communicate with a local area network of Self-Service Terminals (SSTs). The router can include a processor to receive a communication data packet, the communications data packet including embedded executable instructions which, when extracted and run by the processor, cause the processor to perform the operations of cloning the communications data packet; and transferring cloned copies of the communications data packet to a plurality of SSTs, wherein the cloned copies of the communications data packet include product update information.

In yet another embodiment, the present solution relates to a router in communication with an SST through a server. The router includes one or more processors coupled to a memory device, the memory device containing instructions that, when executed by the one or more processors, cause the system to perform the operations of receiving an executable data packet created by the SST, from the server, that includes a readable instruction that the data packet is a payment packet; determining that the data packet is a payment packet; and transforming the executable data packet at the router by adding new encryption information to the executable data packet.

Figure 1:
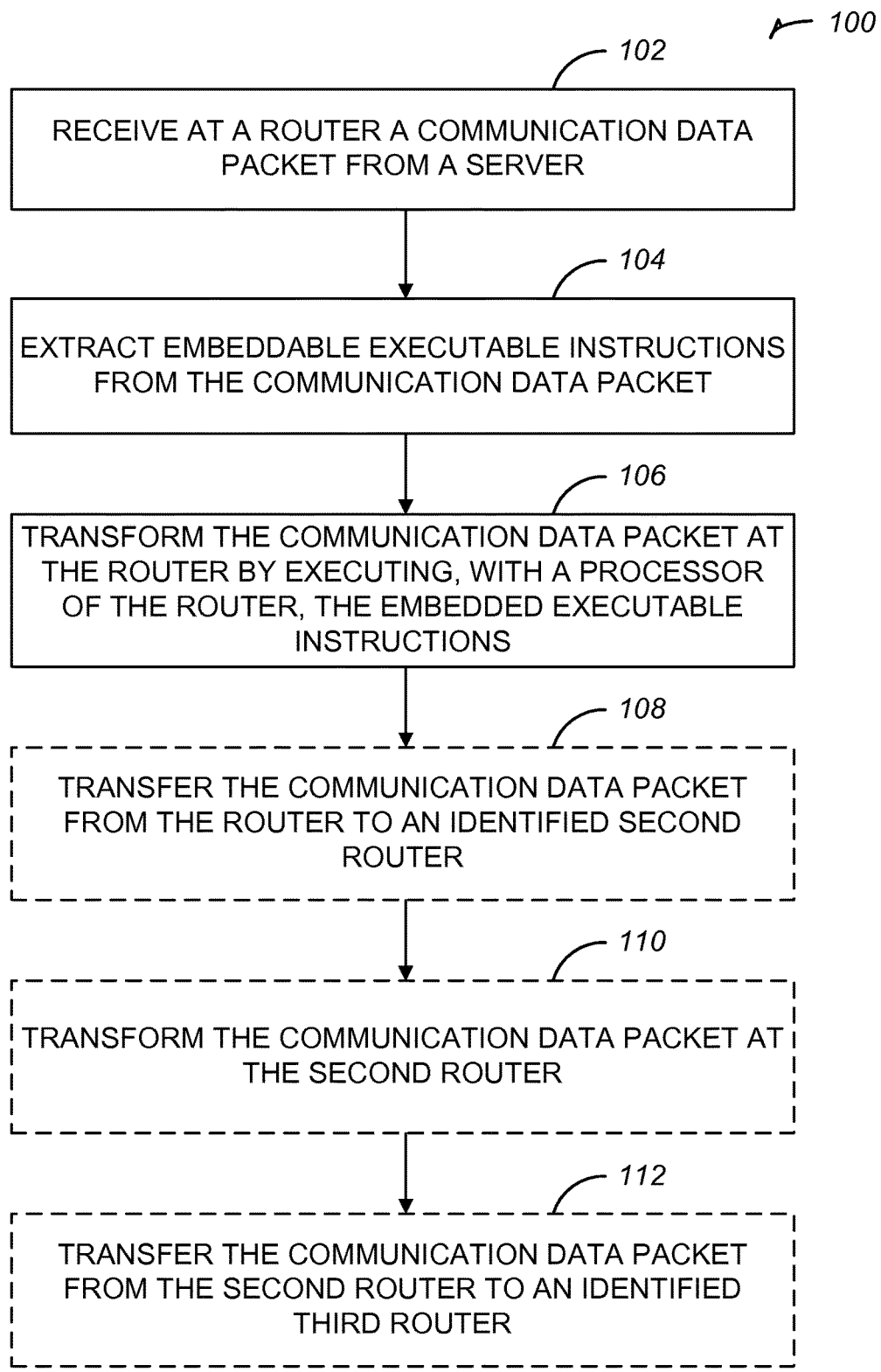
FIG. 1 is a flow chart of a method of transforming a data packet in accordance with some embodiments.

FIG. 1 provides a flow chart of a method of transforming a data packet according to one example of the present description. The method 100 can include operation 102 to receive at a router a communication data packet from a server. The method 100 can further include operation 104 to extract embedded executable instructions from the communication data packet. Method 100 can additionally include operation 106 to transform the communication data packet at the router by executing, with a processor of the router, the embedded executable instructions.

In one example, the embedded executable instructions include an identity of a second router to which the communications data packet is to be transferred from the router. As such, method 100 can optionally further include operation 108 to transfer the communication data packet from the router to the identified second router. Where the communications data packet is transferred to the second router, the method can optionally include operation 110 to transform the communication data packet at the second router using the embedded executable instructions (as potentially altered at the first router). Further, the method can optionally include operation 112 to transfer the communications data packet from the second router to a third router. The third router may be, in some examples, identified by the executable instructions in communications data packet. It will be understood that the communications data packet may be transferred any given number of times to different routers, and at each router, the communication data packet can be transformed.

In some embodiments, at operation 102, the router can also receive a second communication data packet from the server. In such an example, the method can further include extracting embedded executable instructions from the second communication data packet and transforming the communication data packet at the router can include executing the embedded executable instructions from the second communication data packet.

In one example, the operation 106 of transforming the communication data packet can include removing the embedded executable instructions from the communications data packet. This can also be understood as altering the communications data packet into a regular data packet.

The embedded executable instructions in a communications data packet can take various forms in various embodiments. For example, in one embodiment, the embedded executable instructions can include a hop count value that is incremented each time the communication data packet is transferred between differing routers in a network. The embedded executable instructions can also contain a pre-determined terminal hop count value. Once the hop count value reaches the pre-determined hop count terminal value, the communication data packet can be automatically destroyed. Such an example can be effective in defending against so called "man in the middle" attacks on data packets, in which an outside party alters the data packet in an effort to corrupt the target destination of the packet. For example, where an outside party alters the data packet, a hop count can be logged in the data packet. In such a case, where the terminal value of hops is set to the expected number of nodes or routers to be traveled before reaching the desired destination, the alteration of the data packet and corresponding count will mean that the data packet is destroyed before it reaches its ultimate destination (as the terminal hop count will be reached earlier than expected). This will assist in ensuring that the ultimate destination is not compromised by a tainted data packet.

In another embodiment, the executable code can include a data cloning instruction that is executed by the processor of the router at operation 106 to clone data in the communication data packet a plurality of times at the router. In one example, data cloning instructions can be executed after a threshold number of requests for specific data are received at the router (e.g., data corresponding to a given data packet). Such an example may be effective where, e.g., a high number of users are sending requests to a server (via a router) to view a given event or video. Where a threshold number of requests is received, the bandwidth issued being experienced by the high volume of requests from the router to the server (or other router) can be addressed by created the cloned data packets at the router and sending them to the requesters. The cloned data packets can be regular data packets, or can include communication data packets with executable instructions.

In yet another embodiment, the embedded executable instructions can include instructions to disable the functionality of the router. In such an example, the instructions can further include instructions to cause the router to sleep until a new data packet arrives to enable the node to restart or until a timeout occurs. Such an example may be useful in addressing both potential security threats at routers, and in providing power savings and efficiency in a network system.

In one example, the embedded executable instructions can be embedded into the data packet at a router (or at multiple routers as the data packet travels through a network).

Figure 2:
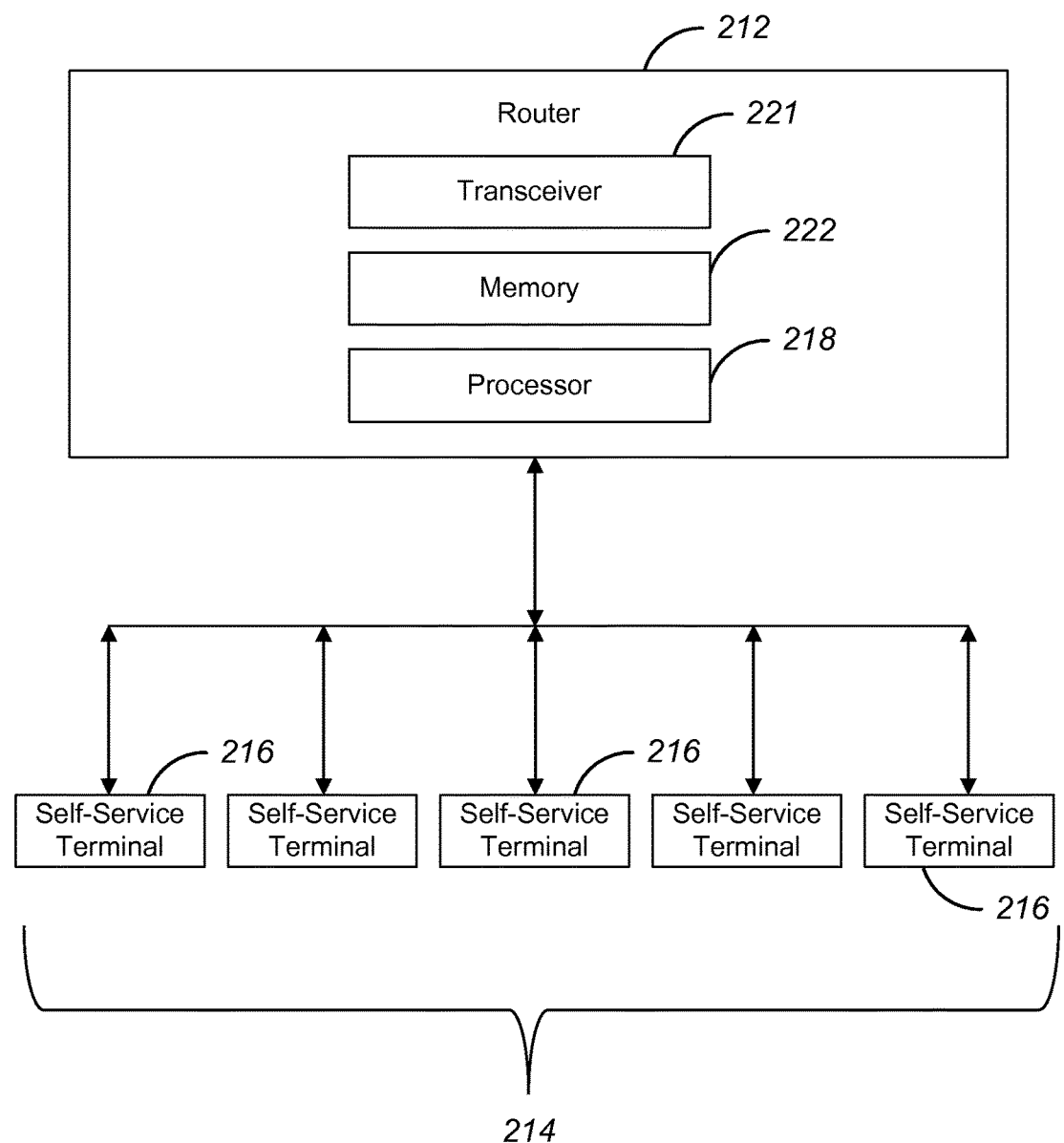
FIG. 2 is a diagram of a router connected to a wide area network configured to communicate with a local area network of Self-Service Terminals (SSTs) in accordance with some embodiments.

FIG. 2 provides a diagram of a router 212 connected to a wide area network configured to communicate with a local area network 214 of Self-Service Terminals (SSTs) 216, according to the present description. The router 212 can include a processor 218 to receive a communication data packet. The router can further include a memory 222 that can contain important materials, such as instructions, and a transceiver 221 for transmitting and receiving information (such as the data packets). The communications data packet can include embedded executable instructions which, when extracted and run by the processor 218, cause the processor 218 to perform operations. Those operations can include cloning the communications data packet; and transferring cloned copies of the communications data packet to a plurality of SSTs 216. In one example, the cloned copies of the communications data packet include product update information. In at least one example, the cloned copies of the communication data packet do not include embedded executable instructions. In other words, the cloned copies can be regular data packets. The product update information can include pricing information corresponding to a scannable item, where the scannable item is represented in a database in the SST.

Figure 3:
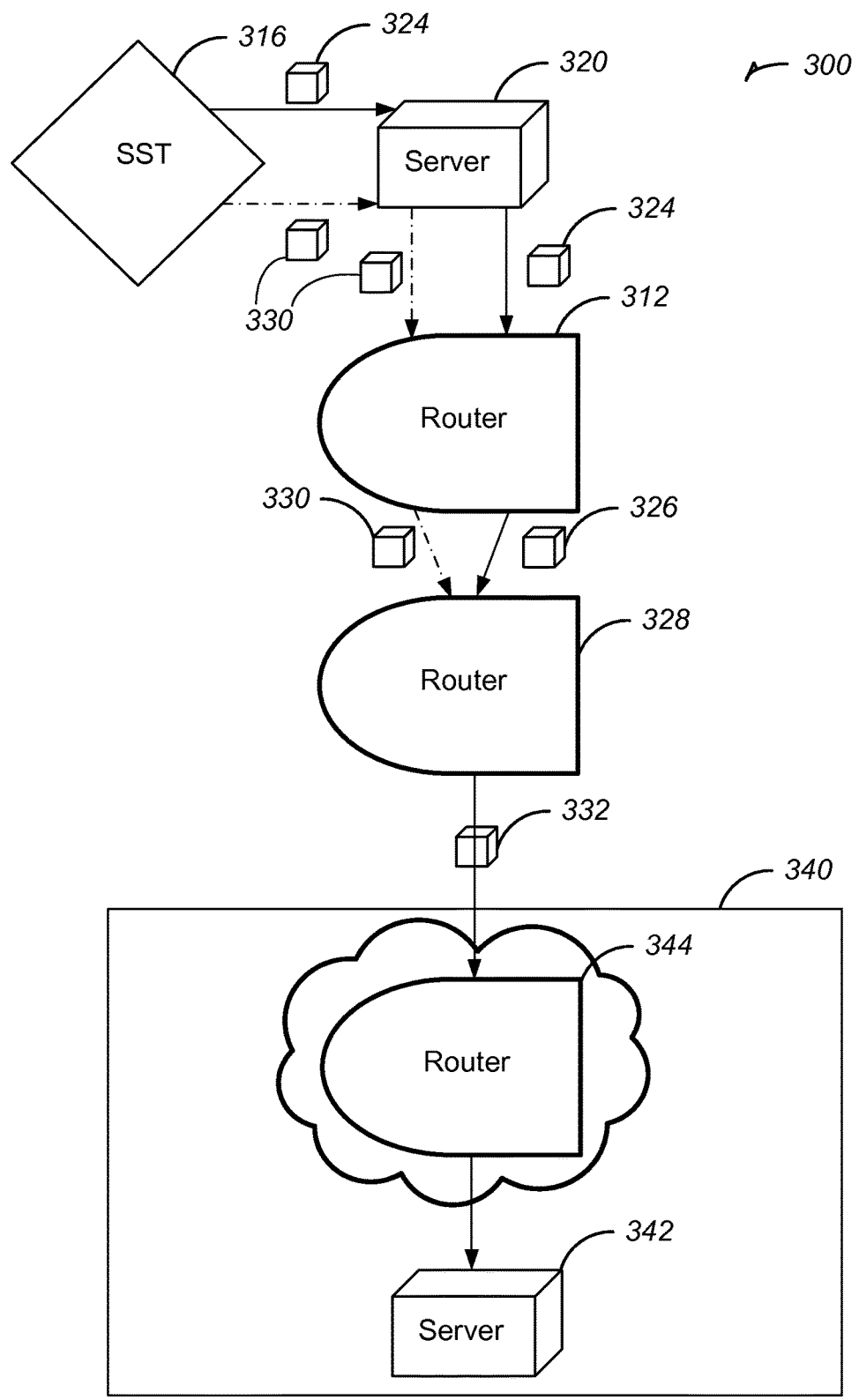
FIG. 3 is a diagram of a router in communication with an SST through a server in accordance with some embodiments.

FIG. 3 illustrates yet another embodiment according to the present description. System 300 of FIG. 3 includes a router 312 that is in communication with a Self-Service Terminal 316 through a server 320. The router 312, like router 212 of FIG. 2, can include one or more processors as well as a memory device and transceiver. The memory device of router 312 can contain instructions that, when executed by the one or more processors of the router, cause the system 300 to perform operations that include receiving an executable data packet 324 created by the SST 316, from the server 320, that includes a readable instruction that the data packet is a payment packet. Executable data packet 324 can be understood as a communication data packet with embedded executable instructions, as described above. The operation further includes the router 312 determining that the data packet 324 is a payment packet, and transforming the executable data packet at the router by adding new encryption information to the executable data packet (such that it is passed on to the next router in the network as an altered executable data packet 326). The memory device of router 312 can include instructions that, when executed by the one or more processors of router 312, cause the system to perform operations that further include sending the altered executable data packet 326 to a second router 328 from the first router 312. The second router 328 can also add new encryption information or layers to the executable data packet 326 such that it is transferred from second router 328 as further altered data packet 332.

FIG. 3 further illustrates that router 312 and potentially second router 328 can each also receive regular data packets 330. However, as shown, the system does not alter the regular packets 330 between router 312 and 328 by adding encryption information. At least the second router 328 (and potentially router 312) will be capable of distinguishing payment packets (e.g. packet 324) from regular packets 330. The packet 332 sent from router 328 may be an altered packet, as noted, or could correspond to regular packet 330 in some embodiments. Second router then transfers packet 332 to an infrastructure 340 that can include a cloud router 344 and server 342. In one example, infrastructure 340 is a payment network infrastructure and server 342 can be understood as a payment server.

Figure 4:
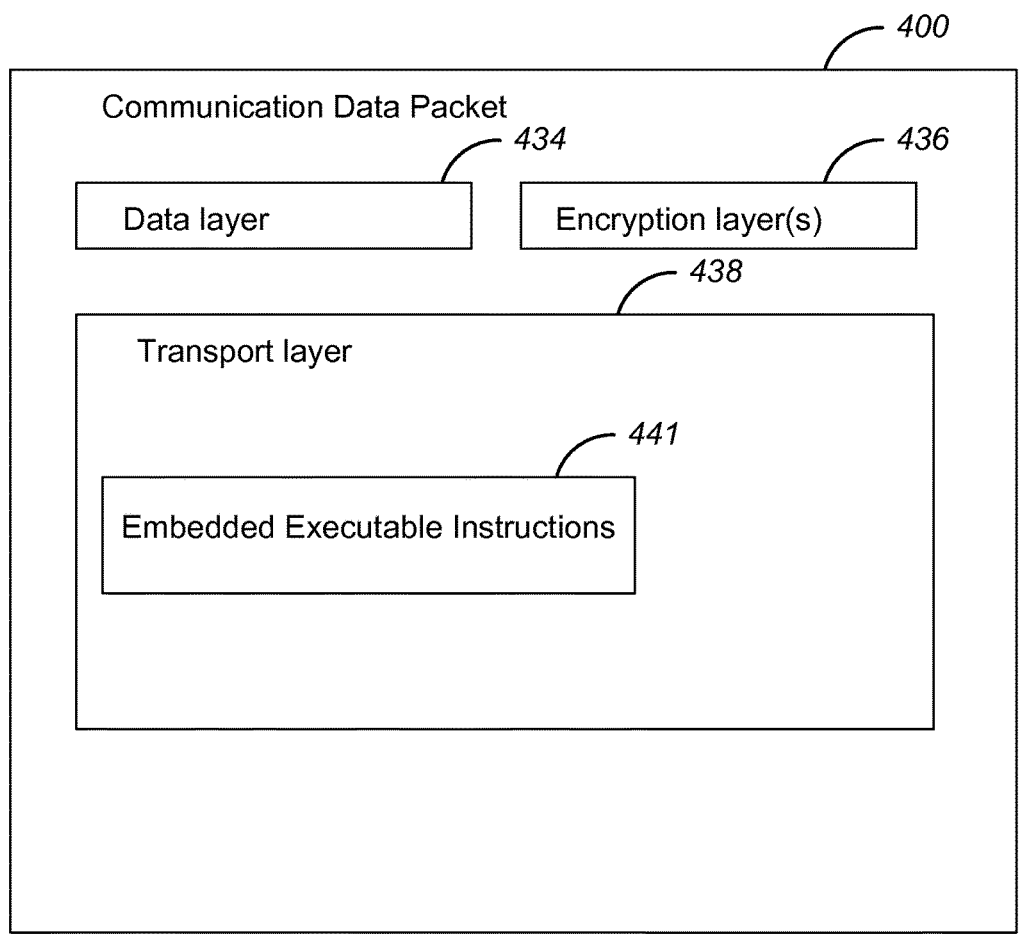
FIG. 4 is a block diagram of a communication data packet in accordance with some embodiments.

FIG. 4 provides a block diagram of one potential communication data packet 400 according to the present description. As shown, communication data packet can include a data layer 434. Data layer can include standard data to be communicated via the network and is of the type present in regular data packets. Communication data packet 400 can also include an encryption layer or layers 436. Encryption layer(s) 436 can include encryption information that is capable of prohibiting a recipient of the data packet from viewing the data and instruction information in the data packet. As noted with respect to the embodiment in FIG. 3 above, the encryption layer 436 can be altered at various routers in a network (or encryption layers can be added). Communication data packet additionally includes a transport layer 438. Transport layer 438 is the layer into which embedded executable instructions 440 can be stored. The embedded executable instructions 440 can include any number of various instructions to be provided at various nodes throughout the network, including but not limited to the instructions described herein.

In an example, an SST may include a kiosk (e.g., a movie rental machine, a vending machine, etc.).

In an example, an SST may include an ATM or an assisted ATM.

In an example, an SST may include a POS.

In an example, an SST may include a card authentication system, such as for a hotel room key. The card authentication system may include a card matching or generation system or a card authenticator of a pre-made card.

In an example, an SST may include a chip and pin reader for a credit card, a debit card, an identification card, an integrated circuit card (chip card), or the like. For example, the chip and pin reader may be used to purchase goods or withdraw money (e.g., using a Europay MasterCard Visa (EMV) system).

In an example, an SST may include a payment facilitating machine (e.g., a tablet with a card reader, etc.).

Figure 5:
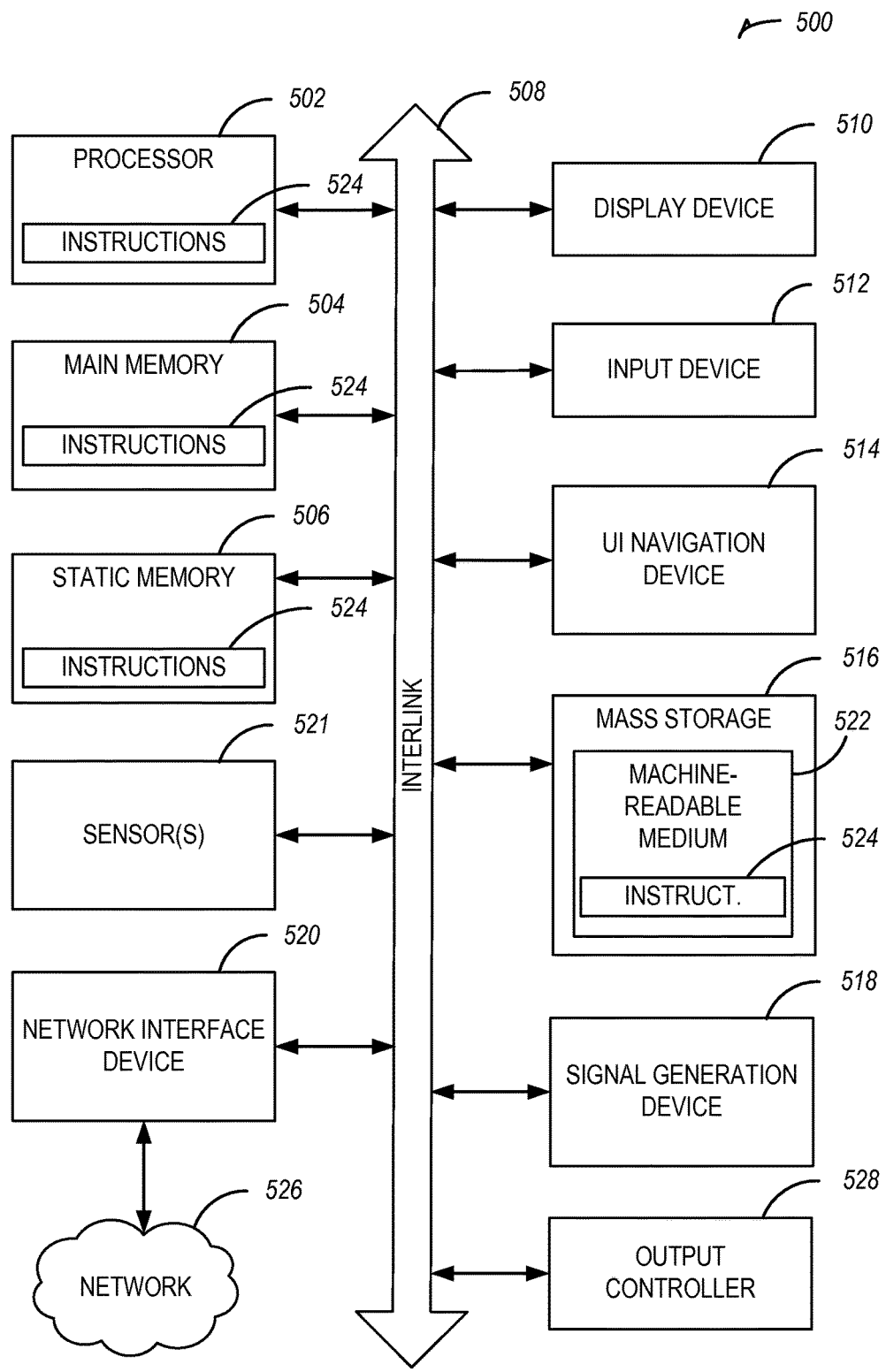
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module.

For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples can stand on its own, or can be combined in various permutations or combinations with one or more of the other examples.

Example 1 includes a method of transforming a data packet. The method includes receiving at a router a communication data packet from a server, extracting embedded executable instructions from the communication data packet, and transforming the communication data packet at the router by executing, with a processor of the router, the embedded executable instructions.

In Example 2, the subject matter of Example 1 can optionally include embedded executable instructions that include an identity of a second router to which the data packet is to be transferred from the router.

In Example 3, the subject matter of Examples 1-2 can optionally include transferring the communication data packet from the router to the identified second router.

In Example 4, the subject matter of Examples 1-3 can optionally include wherein the embedded executable instructions further comprise an identity of a third router to which the data packet is to be transferred from the second router and the method further comprises transferring the communication data packet from the second router to the third router.

In Example 5, the subject matter of Examples 1-4 can optionally include the communication data packet being further transformed at the second router.

In Example 6, the subject matter of Examples 1-5 can optionally include wherein transforming the communication data packet includes removing the embedded executable instructions form the communication data packet.

In Example 7, the subject matter of Examples 1-6 can optionally include receiving at the router a second communication data packet from the server, extracting embedded executable instructions from the second communication data packet, wherein transforming the communication data packet at the router includes executing the embedded executable instructions from the second communication data packet.

In Example 8, the subject matter of Examples 1-7 can optionally include the embedded executable instructions comprising a hop count value that is incremented each time the communication data packet is transferred between differing routers in a network, and a pre-determined terminal hop count value.

In Example 9, the subject matter of Examples 1-8 can optionally include the communication data packet being destroyed once a hop count value reaches a pre-determined hop count terminal value.

In Example 10, the subject matter of Examples 1-9 can optionally include the executable code comprising a data cloning instruction executed by the processor of the router to clone data in the communication data packet a plurality of times at the router.

In Example 11, the subject matter of Examples 1-10 can optionally include the data cloning instruction being executed after a threshold number of requests for the data are received at the router.

In Example 12, the subject matter of Examples 1-11 can optionally include the embedded executable instructions including instructions to disable functionality of the router.

In Example 13, the subject matter of Examples 1-12 can optionally include instructions to disable the functionality of the router further including instructions to cause the router to sleep until a new data packet arrives to enable the node to restart or until a timeout occurs.

In Example 14, the subject matter of Examples 1-13 can optionally include that the embedded executable instructions are embedded into the data packet at a router.

Example 15 includes a router connected to a wide area network configured to communicate with a local area network of Self-Service Terminals (SSTs), including a processor to receive a communication data packet, the communications data packet including embedded executable instructions which, when extracted and run by the processor, cause the processor to perform operations comprising: cloning the communications data packet; and transferring cloned copies of the communications data packet to a plurality of SSTs, wherein the cloned copies of the communications data packet include product update information.

In Example 16, the subject matter of Example 15 can optionally include that the cloned copies of the communications data packet do not include embedded executable instructions.

In Example 17, the subject matter of Examples 15-16 can optionally include the product update information including pricing update information corresponding to a scannable item, the scannable item represented in a database in the SST.

Example 18 includes a router in communication with a Self-Service Terminal (SST) through a server, the router comprising: one or more processors coupled to a memory device, the memory device containing instructions that, when executed by the one or more processors, cause the system to perform operations comprising: receiving an executable data packet created by the SST, from the server, that includes a readable instruction that the data packet is a payment packet; determining that the data packet is a payment packet; and transforming the executable data packet at the router by adding new encryption information to the executable data packet.

In Example 19, the subject matter of Example 18 can optionally include the memory device containing instructions that, when executed by the one or more processors, cause the system to perform operations further comprising: sending the executable data packet to a second router from the first router.

In Example 20, the subject matter of Examples 18-19 can optionally include a second router further transforming the by adding new encryption information to the executable data packet The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of transforming a data packet, comprising:
   receiving at a router a communication data packet from a server,
   extracting embedded executable instructions from the communication data packet, and
   transforming the communication data packet at the router by executing, with a processor of the router, the embedded executable instructions, the received data packet containing the executable instructions that are extracted and executed by a processor of the router to transform the data packet itself, to disable functionality of the router, and including:
   a data cloning instruction executed by the processor of the router to clone data in the communication data packet a plurality of times, each clone of the data cloning including less than an entirety of the received communications data packet, a portion of the communications data packet not included in each clone including the embedded executable instructions;
   a hop count value that is incremented each time the communication data packet is transferred between differing routers in a network, and a pre-determined terminal hop count value of a number of hops expected before reaching a destination, the pre-determined terminal hop count value, when reached providing an instruction to destroy the communication data packet.

2. The method of claim 1, wherein the embedded executable instructions include an identity of a second router to which the data packet is to be transferred from the router.

3. The method of claim 2, further comprising transferring the communication data packet from the router to the identified second router.

4. The method of claim 3, wherein the embedded executable instructions further comprise an identity of a third router to which the data packet is to be transferred from the second router and the method further comprises transferring the communication data packet from the second router to the third router.

5. The method of claim 3, wherein the communication data packet is further transformed at the second router.

6. The method of claim 1, wherein transforming the communication data packet includes removing the embedded executable instructions from the communication data packet.

7. The method of claim 1, further comprising receiving at the router a second communication data packet from the server, extracting embedded executable instructions from the second communication data packet, wherein transforming the communication data packet at the router includes executing the embedded executable instructions from the second communication data packet.

8. The method of claim 1, wherein the communication data packet is destroyed once the hop count value reaches the pre-determined hop count terminal value.

9. The method of claim 1, wherein the data cloning instruction are executed after a threshold number of requests for the data are received at the router.

10. The method of claim 1, wherein the instructions to disable the functionality of the router further include instructions to cause the router to sleep until a new data packet arrives to enable the node to restart or until a timeout occurs.

11. The method of claim 1, wherein the embedded executable instructions are embedded into the data packet at a router.

12. A router connected to a wide area network configured to communicate with a local area network of Self-Service Terminals (SSTs), comprising:

a processor to receive a communication data packet, the communications data packet including embedded executable instructions which, when extracted and run by the processor, cause the processor to perform operations to disable functionality of the router and to transform the data packet itself including operations comprising:

cloning the communications data packet, the clone of the communications packet including less than an entirety of the received communications data packets, a portion of the communications data packet not included in the clone including the embedded executable instructions; and transferring cloned copies of the communications data packet to a plurality of SSTs, wherein the cloned copies of the communications data packet include product update information, a hop count value that is incremented each time the communication data packet is transferred between differing routers in a network, and a pre-determined terminal hop count value of a number of hops expected before reaching a destination, the pre-determined terminal hop count value, when reached providing an instruction to destroy the communication data packet.

13. The router of claim 12, herein the product update information includes pricing update information corresponding to a scannable item, the scannable item represented in a database in the SST.

* * * * *